No. 668,772. Patented Feb. 26, 1901.
T. COVENTRY.
BEVEL GEAR CUTTING MACHINE.
(Application filed Feb. 8, 1900.)
(No Model.) 5 Sheets—Sheet 1.
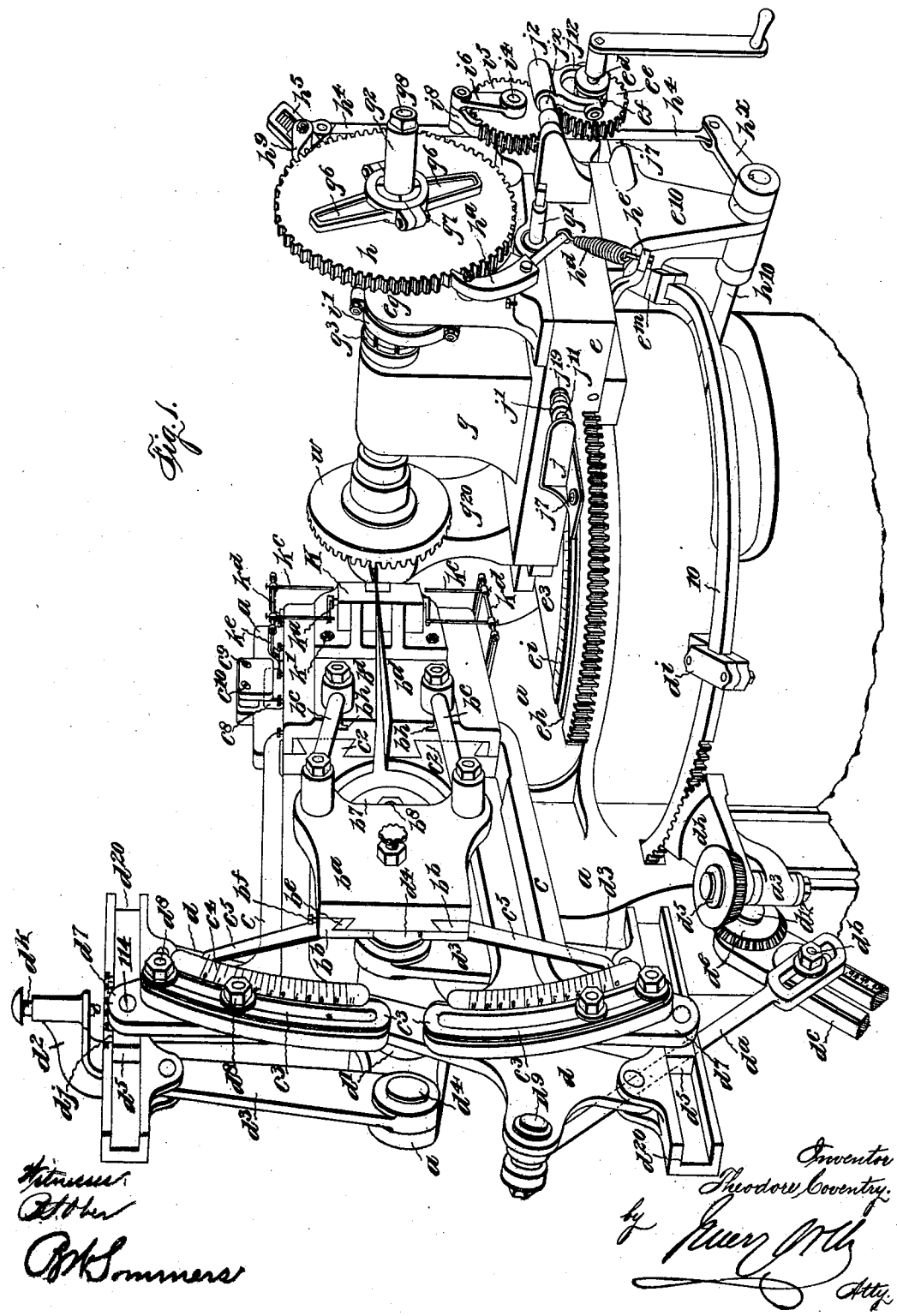

No. 668,772. Patented Feb. 26, 1901.
T. COVENTRY.
BEVEL GEAR CUTTING MACHINE.
(Application filed Feb. 8, 1900.)
(No Model.) 5 Sheets—Sheet 2.
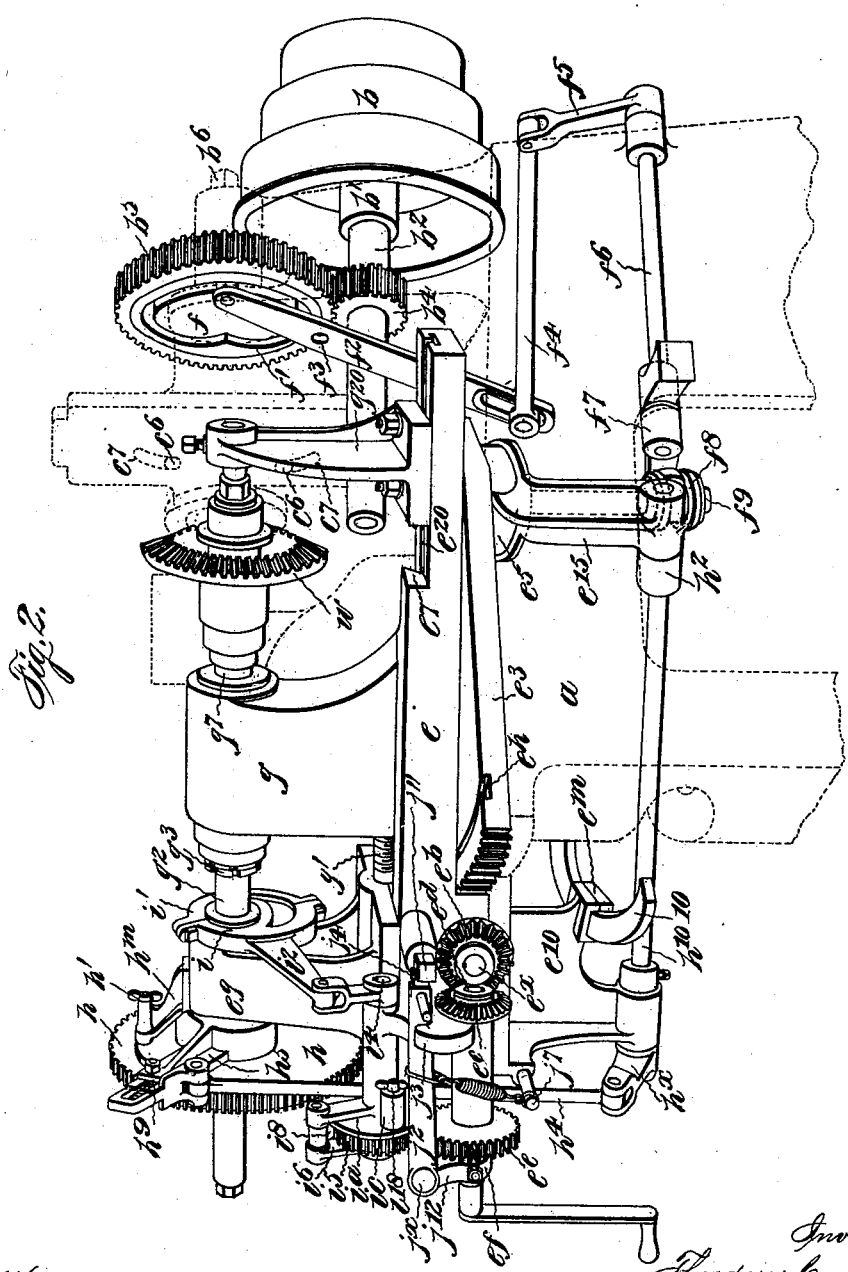

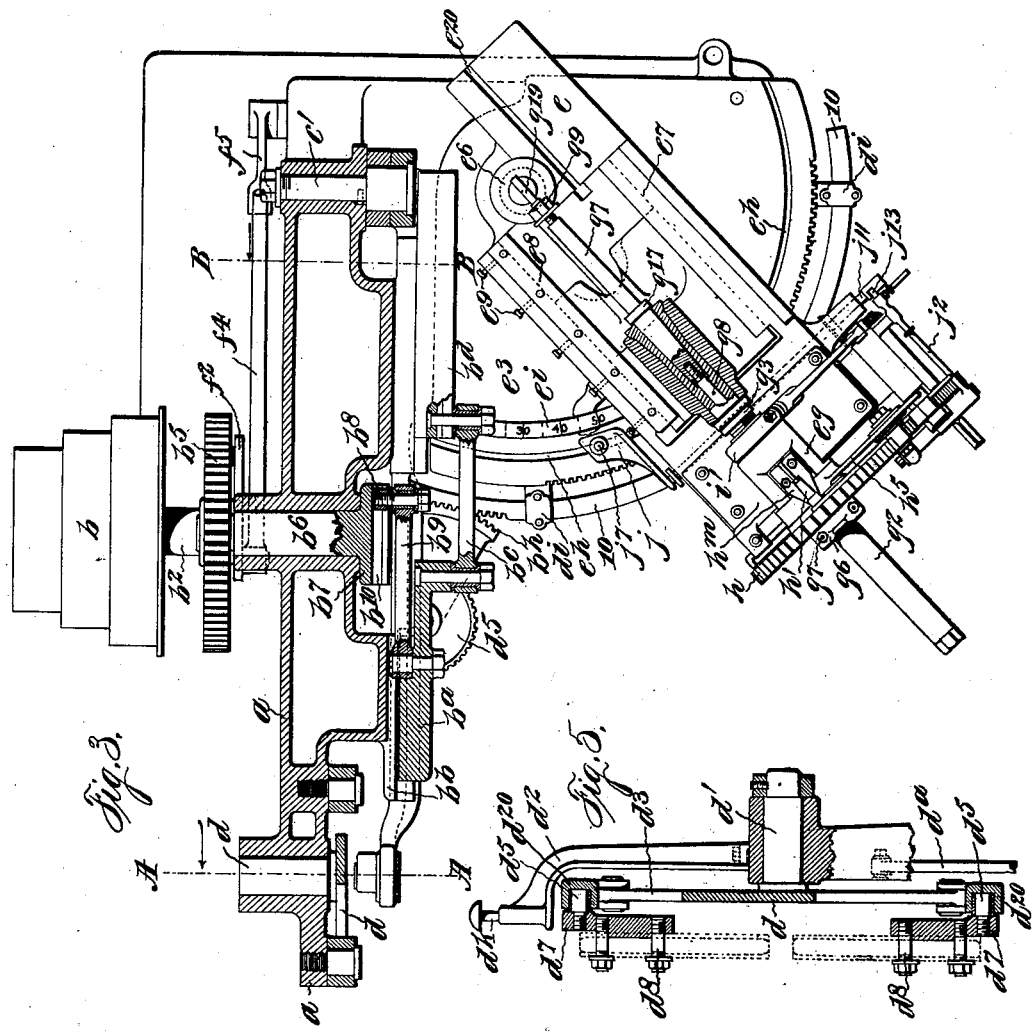

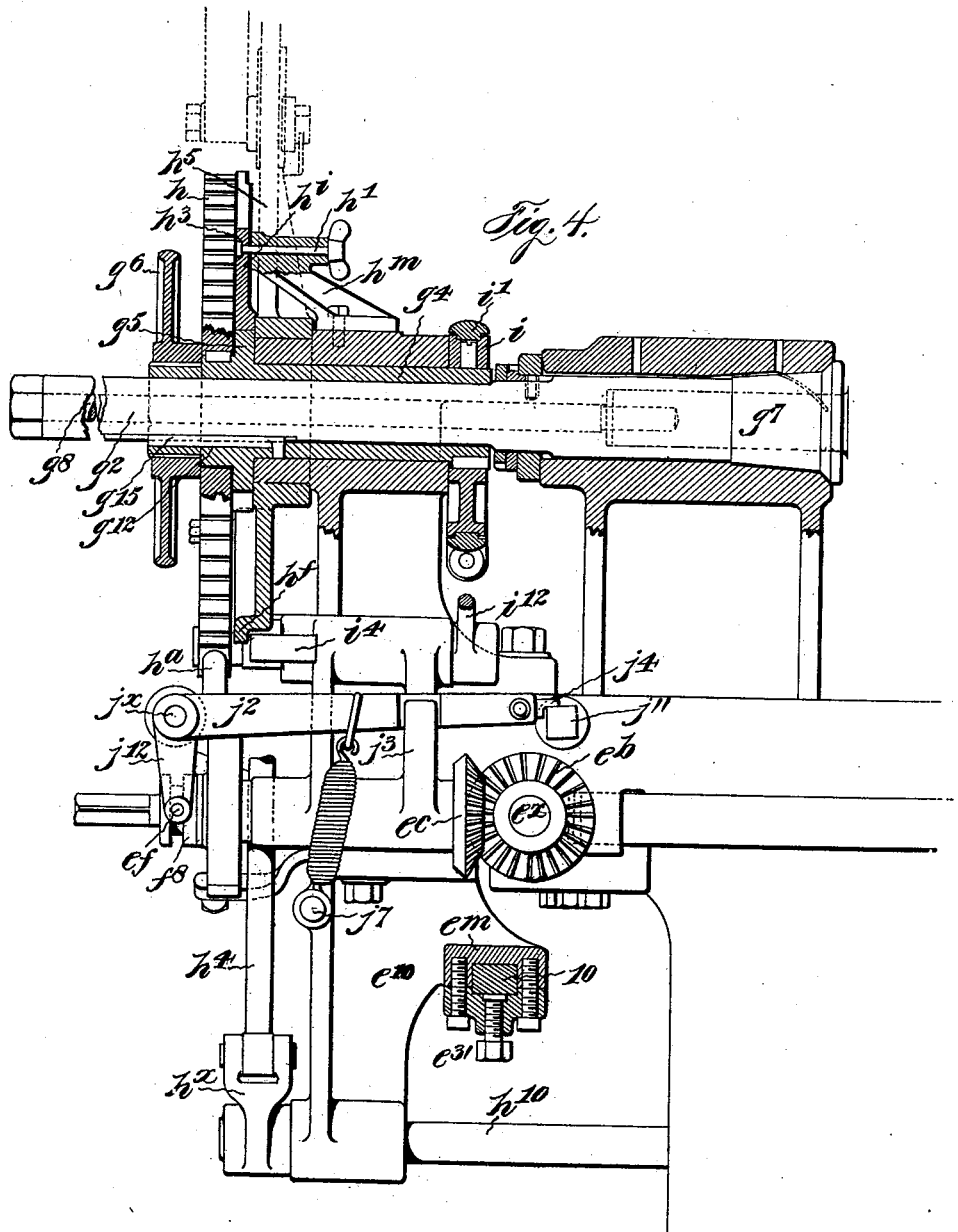

No. 668,772.　　　　　　　　　　　　　　　　Patented Feb. 26, 1901.
T. COVENTRY.
BEVEL GEAR CUTTING MACHINE.
(Application filed Feb. 8, 1900.)
(No Model.)　　　　　　　　　　　　　　　　5 Sheets—Sheet 5.
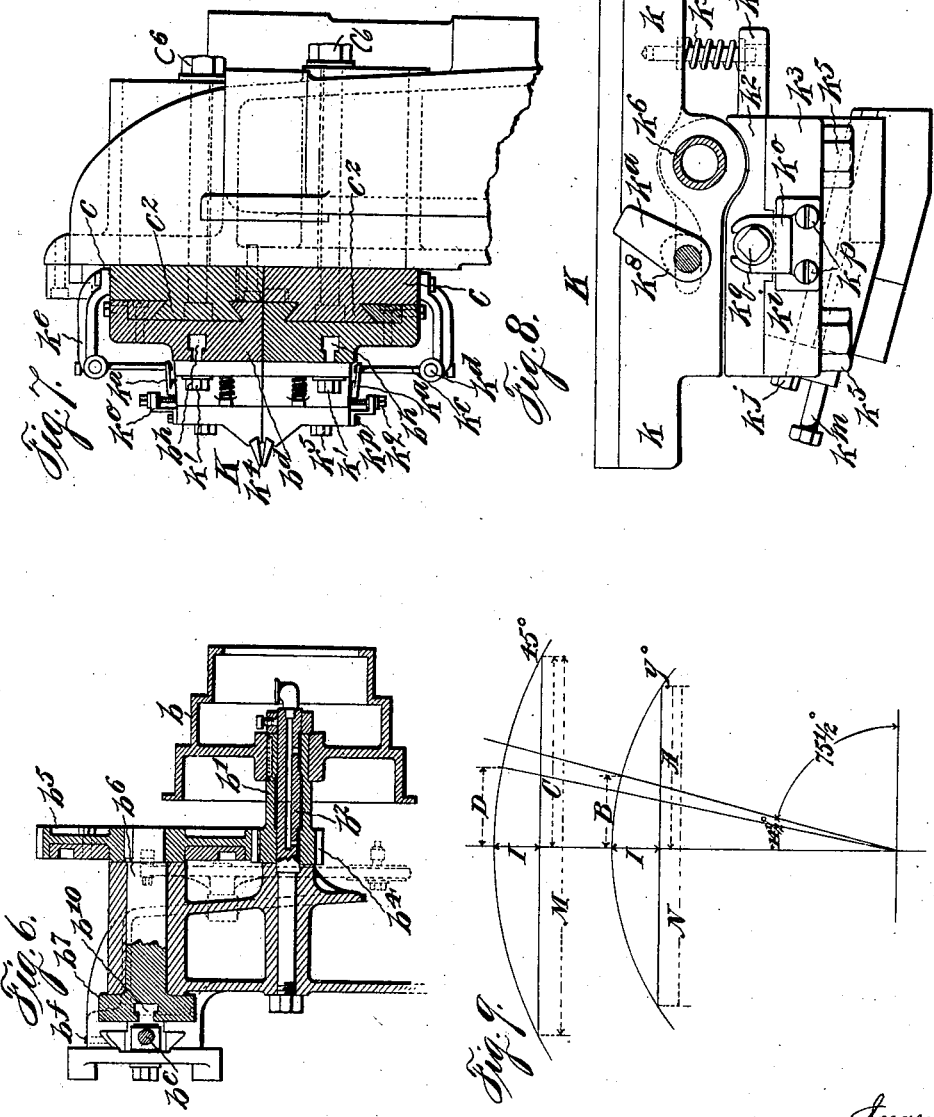
Witnesses:
Inventor,
Theodore Coventry.
by
Atty.

UNITED STATES PATENT OFFICE.

THEODORE COVENTRY, OF MANCHESTER, ENGLAND, ASSIGNOR TO SMITH AND COVENTRY, LIMITED, OF SALFORD, MANCHESTER, ENGLAND.

BEVEL-GEAR-CUTTING MACHINE.

SPECIFICATION forming part of Letters Patent No. 668,772, dated February 26, 1901.

Application filed February 8, 1900. Serial No. 4,523. (No model.)

*To all whom it may concern:*

Be it known that I, THEODORE COVENTRY, a subject of the Queen of Great Britain, residing at Salford, Manchester, in the county of Lancaster, England, have invented certain new and useful Improvements in Bevel-Gear-Cutting Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My invention relates to machines for cutting miter and other bevel gears in which there is one of a pair of reciprocating cutting-tools traveling in radial lines from a central support and taking cuts along the breadth of the tooth as the wheel-blank is fed up to the tools, these same cuts being taken on each tooth successively, in order to do which the wheel-blank is rotated after each cut, or each tooth may be finished separately; and the invention has for its object improved means for actuating the cutters, for feeding the blank thereto, and for actuating the machine, as will be fully described in the following specification and particularly pointed out in the claims.

Referring to the drawings, in which like parts are similarly designated, Figure 1 is a perspective view of my improved machine, part of the stand or frame being broken away. Fig. 2 is a perspective view showing the opposite side of the carriage to that shown in Fig. 1, with the former-arms removed. Fig. 3 is a plan view, partly in section. Fig. 4 is a side elevation, partly in section, of the front part of the carriage. Fig. 5 is a section through the former-arms on the line A A, Fig. 3. Fig. 6 is a section through the axis of the driving-pulley. Fig. 7 is a section through the former-arms on line B B, Fig. 3. Fig. 8 is a detail of a tool-holder. Fig. 9 is a diagram illustrating the adjustment-scales.

Bevel-gears are cut from a conical blank or rather one having the form of a truncated right cone, and the teeth that are cut thereon have ends that are trapezoidal in form, their points being elements of a cone. Hence it is necessary to guide the cutting-tools, so that the distance between them becomes narrower as they proceed on their cut, it of course being understood that the tools travel from the base toward the apex of the blank, although they might be arranged to travel in the opposite direction; but the former is preferred. Thus it is seen that the tools travel in straight lines, and in order to make involute teeth the distance apart of these tools must be varied, so that a conical surface will be cut from the point to the root of the tooth, whose elements are straight lines and whose section is the involute shape desired.

The machine shown is entirely automatic, after being set to work, being driven from a single belt-pulley which operates the mechanism for reciprocating the tools, for turning the blank to be cut, and for feeding the blank toward the tools.

In the drawings, in which I have shown my machine as provided with a pair of cutting-tools adapted to cut from the base toward the apex of the conical blank, $b$ is a stepped driving-pulley from which the entire machine is operated. This pulley is mounted on a sleeve $b'$ and the latter on a stub-shaft $b^2$, bolted to the frame of the machine. This pulley $b$ drives a pinion $b^4$, mounted on the same sleeve $b'$, which pinion drives a gear-wheel $b^5$, fast on the end of a shaft $b^6$, journaled in the frame, the front end of said shaft $b^6$ carrying a disk $b^7$, provided with either a radial or a diametrical slot $b^{10}$, in which a stud $b^8$ is adjustable to form a crank whose length is variable. It is this stud that indirectly drives the tools, while their distance apart is controlled by other mechanism to be described. The stud $b^8$ is connected to a reciprocating slide $b^a$ by means of a rod $b^9$.

The slide $b^a$ works in a pair of slideways $b^b$, which together form a dovetailed groove in the frame, the upper one of which ways is provided with a wear-plate $b^e$, adjustable by means of screws $b^f$, to take up the wear of the rubbing parts. The slide $b^a$ is connected by rods $b^c$ to each of the tool-slides $b^d$ and reciprocates said slides in unison on slideways $c^2$ on the former-arms $c$, said arms being the devices for spacing the tools to give the desired curve to the face and flank of the tooth, as will hereinafter appear. These slideways $c^2$ are dovetails on which slide the tool-carrier slides $b^d$, each of said slides being provided with a dovetail groove on its back, fitting the slideways $c^2$ on the former-arms and provided with an adjustable wear-plate. The front of each of these tool-carrier slides $b^d$ has a longitudinal undercut slot $b^h$, into which the tool-carriers K are fastened to reciprocate with the slides that carry them. These tool-carriers K (shown in detail in Fig. 8) comprise a body portion or base $k$, which has a perforation in each end for bolts $k'$, whose heads take into the undercut slots $b^h$ in the tool-carrier slides $b^d$ and whose nuts firmly clamp the tool-carrier in position on said slides. To said body portion or base $k$ is hinged at one end the tool-holder proper by means of the pin $k^6$, and in the base is also a cam $k^8$, provided with a lever $k^a$, operated by tappets at each end of the travel of the tools $k^i$ to cam out the tool-holder and throw the cutting edge of the tool clear of the metal to be worked upon to prevent the tools from scraping during their return.

The tool-carrier $k^2$ has a projecting nose $k^g$, which is acted on by a coil-spring $k^f$, located between it and the base $k$ to turn the tool-carrier back into the cutting position after the cam is withdrawn. The front portion $k^3$ is secured to the portion $k^2$ by means of bolts $k^5$, passing through the vertical slots in said front portion, and on top of this part is secured a bracket $k^o$ by means of screws $k^p$, said bracket working in a collar on an adjustable screw $k^q$, whereby when loosening the nuts $k^5$ the vertical adjustment of the tools can readily be effected. The tool itself is held in a dovetailed or undercut slot $k^i$ by means of a screw $k^m$ and wedge $k^j$.

Secured to and projecting from each slideway $c$ is a pair of brackets $k^e$, carrying a rod $k^d$, from which project fingers or tappets $k^c$, adjustable along the rod, that act on the lever $k^a$ to operate the cam $k^8$ at each end of the travel of the tools to trip and to return the tool-carrier again to cutting position.

The former-arms $c$, on which travel the tool-carrier slides, have a common fulcrum at one end on a stud $c'$ in the frame $a$, while their opposite ends are enlarged and contain arcuate slots $c^3$, struck from the fulcrum $c'$ as center, and each arm is provided with a scale $c^4$, which is adjusted from a line on the index-arms $c^5$, projecting from the frame.

In order to prevent the former-arms from twisting, a bolt $c^6$ is secured to each and passes through a slot $c^7$ in the frame, said bolts being designed to securely hold the former-arms while roughing out the work. In order to further prevent the former-arms from twisting, especially when these bolts are loosened during the finishing, I provide a projection $c^8$ on the edge of each former-arm, that takes under a guide hook or plate $c^{10}$, secured to the frame by screws $c^9$.

The former-arms are adjusted by means of the scales and indices to set the tools, and when properly adjusted are clamped by the set-screws $d^8$, which are rigid in parts $d^7$, pivoted in slide-blocks $d^5$, that have motion in parallel channels $d^{20}$. The slides $d^5$ and parts $d^7$ form connections between the ends of the former-arms and the parallel motion for spreading said arms, which motion comprises the parallel channels $d^{20}$, connected by means of a common link or radial arm $d$, centrally pivoted at $d'$ to the frame, and a pair of links $d^3$ of equal length, one on either side of the link $d$ and pivoted at one end to the frame at $d^4$ and at the other end to the respective channels $d^{20}$. On the upper channel $d^{20}$ there is a graduated scale $d^j$, which can be set to an index $d^k$, held in an arm $d^2$, rising from the boss of the pivot $d'$ on the frame. It is evident that by varying the angle between the links $d$ $d^3$ and the line of centers the distance between the channels can be varied, said channels always remaining parallel and resulting in a variation of spread of the former-arms pivoted in them. Near the lower end of the link $d$ there is pivoted at $d^9$ a connecting-rod $d^a$, adjustable by a bolt $d^b$ in a slotted graduated lever $d^c$. This lever is connected to a bevel-gear $d^e$, journaled in a bracket from the frame, and meshes with a similar gear $d^5$, journaled in a bracket $a^3$ from the frame, and carries a toothed sector $d^h$, which sector meshes with a rack formed on the end of an arcuate bar 10. This bar has bearing in and motion through brackets $d^i$ from the frame $a$ and is moved by and concentric with the carriage that feeds the blank $w$ to the tools. The movement of the rod by the carriage will rotate the sector $d^h$ and bevel-wheel $d^5$, which will move the bevel-wheel $d^e$ gearing with it and draw the lever $d^a$ down toward the frame $a$, which in turn will rotate the two-armed lever or link $d$ on its pivot and move it toward vertical position to increase the distance between the parallel channels $d^{20}$ and spread the former-arms $c$, pivoted therein, producing the final result of spreading the tools proportionately.

In front of the tool-carrying mechanism on the frame $a$ is secured a table $e^3$, approximately a quadrant, having a boss that fits a hole in the frame, and on the edge of the table are formed worm-teeth, and near its edge is a circular scale $e^i$, divided into degrees, and near it an undercut slot $e^h$, in which a stop $j$ is adjustable by means of a bolt $j^7$. It is on this table $e^3$ that the carriage is moved from the driving-pulley by means of intermediate mechanism, which is arranged as follows: On the spur-gear $b^5$ I bolt a plate $f$, having in it a cam-groove $f'$, in which travels a bowl on the upper end of a lever $f^2$, pivoted at $f^3$ on the back of the frame. The lower slotted end of this lever $f^2$ is connected by a rod $f^4$ and a crank-arm $f^5$ to a rock-shaft $f^6$, supported in bearings in the framing, which shaft carries a rock-shaft $f^7$, carrying a bowl that engages a bobbin $f^8$, loose on the axis $f^9$ of the table. This arrangement causes a rocking motion to be imparted to the rock-shaft $f^6$ at the end of every revolution of the cam-groove, which vertically reciprocates the bobbin $f^8$. The carriage comprises a base-plate $e$, provided with a bearing fitting a tubular stud $e^5$, passing up through the table $e^3$ and base-plate. This stud $e^5$ supports under the table a bracket $e^{15}$, hereinafter referred to, and is locked in position by a washer and nut $e^6$ on the upper end of the descending stud $f^9$, which forms the center around which the carriage moves. On the carriage are formed undercut slideways $e^7$, one of which has a wear-plate $e^8$, adjustable by screws $e^9$. In these ways the head-stock $g$ slides and is adjusted by a screw $g'$, rotating in a boss on the carriage and having collars on either side thereof to prevent endwise motion.

The outer end of the screw $g'$ is squared for a key, while the inner end carries a thread and engages a nut held in a recess in the head-stock to move the latter radially.

In the head-stock is held a tubular shaft $g^2$, its inner end being coned to fit into a complementary socket in the head-stock and locked in position by the washer and lock-nuts $g^3$. The inner end of this tubular shaft $g^2$ is also coned internally to receive the coned shank of a mandrel $g^{10}$, which is tapped to receive the end of the long set-screw $g^8$ through the center of the tubular shaft $g^2$. Various sizes of mandrels having the same size shank and fitting various wheel-bosses can be used, and these blanks are secured upon the end of the mandrel against a collar $g^{17}$, turned thereon (or loose collars to suit the various sizes of wheel-bosses may be used) by means of a washer and nut $g^9$ upon the end, which at this portion of the mandrel is threaded and has a reduced projection $g^{19}$ extending over the vertical axis of the carriage and which enters a bearing in a standard or tail-stock $g^{20}$, adjustable along an undercut slot $e^{20}$, and rotates therein. This is to steady the end of the mandrel $g^7$ against the pressure of the cutting-tools and prevent the work from giving under them. Rising from the outer end of the carriage is a standard $e^g$, bolted to the carriage and having a bore in alinement with the axis of the mandrel. In the bore of said standard is journaled a sleeve $g^4$, provided with a collar $g^5$ at its outer end and having a feather or key $g^{15}$, sliding in a keyway $g^{12}$ in the tubular shaft $g^2$, that has bearing in this sleeve, whereby the sleeve and shaft are caused to rotate together without hindering the longitudinal motion of the shaft and the adjustment of the head-stock in which this shaft $g^2$ is secured. On the inner end of the sleeve $g^4$ is fastened an eccentric $i$ and strap $i'$, which, together with the collar $g^5$, prevent displacement of the sleeve during the adjustment of the head-stock $g$. The dividing-wheel $h$ is secured next to the collar by a one or two armed screw-nut $g^6$, whose two halves are screwed together on the end of the sleeve $g^4$ by two bolts $g^{71}$. Oscillating on a bearing on the standard back of the dividing-wheel is a two-armed lever $h^5$, carrying on one end the spring-controlled pawl $h^9$ for turning the dividing-wheel $h$ and on its opposite end a cam-face $h^f$, the object of which is to cam out of engagement from the dividing-wheel the spring-held retaining-pawl $h^a$, pivoted to the standard $e^g$. Secured to the top of the standard is a bracket $h^m$, which is clear of the movement of the arm $h^5$ and carries a thumb-screw and nut $h^i$, whose head slides in a concentric slot $h^3$ in a partial disk $h^i$ for locking the same in position, said partial disk being journaled on the collar $g^5$ just behind the dividing-wheel $h$. The object of this disk, whose edge projects slightly beyond the teeth of the dividing-wheel, is to block out from effective action any number of teeth on the dividing-wheel, so that the pawl $h^9$ will move the wheel a shorter or longer distance, so that a dividing-wheel having any given number of teeth may be used to enable the machine to cut any gear whose number of teeth is a factor of the number of teeth of the dividing-wheel. For instance, by using a wheel with one hundred and twenty teeth the disk can be adjusted, so that the pawl $h^9$ will pass over and move the dividing-wheel a distance of eight, six, five, four, three, two, one teeth at each movement, thus cutting gears with fifteen, twenty, twenty-four, thirty, forty, sixty, or one hundred and twenty teeth, respectively. With pattern or dividing wheels having a different number of teeth other gears can be cut.

Below the carriage depends a bracket $e^{10}$, which has journaled therein a rock-shaft $h^{10}$, having an arm $h^x$, connected to the lever $h^5$ by means of the connecting-rod $h^4$, the opposite end of this shaft being supported in the bracket $e^{15}$, before referred to, at the pivot of the table, and as the table moves about its center this bracket moves with it. From this end of the rock-shaft $h^{10}$ is an arm $h^2$, carrying a bowl that enters the bobbin $f^8$. It is now clear that the power imparted to the cam $f$ and the rock-shaft $f^6$ is transmitted through the bobbin $f^8$ to the second rock-shaft $h^{10}$ on the carriage, the bobbin forming a joint between these two rock-shafts, and a step-by-step motion is given to the dividing-wheel $h$ at every revolution of the spur-wheel $d^5$ and reciprocation of the tools. The feed of the carriage toward the cutters, which takes place at every revolution of the dividing-wheel $h$ and when every tooth has received one cut, is actuated by the eccentric $i$, which is connected by its rod $i^2$ to the rocker-arm $i^{12}$ on one end of a rock-shaft $i^4$, journaled in the side of the carriage and carrying on its forward end a yoke $i^6$ and pawl $i^8$, said yoke straddling a spur-wheel $i^5$, loose on the shaft $i^4$. The pawl $i^8$ may be arranged to take one or more teeth by means of an adjustable plate $i^a$, similar to that described in connection with the dividing-wheel. This is an entire disk having a cut-away portion in which the pawl $i^8$ can act and can be moved and adjusted around its shaft $i^4$ and secured in position by means of a bolt $i^{18}$ in a bracket $i^c$ on the carriage. The spur-wheel $i^5$ gears with a similar wheel $e^e$, also loose on a shaft $e^d$ just below said wheel $i^5$ and adapted to be made fast on its shaft by means of a clutch $e^f$ sliding on a key, the other end of this shaft carrying a bevel-gear $e^c$, engaging a similar gear $e^b$ on the end of a worm $e^x$, that engages the worm-teeth on the edge of the table. Thus it will be seen that the eccentric and rod $i$ move the rock-shaft $i^4$ and by the pawl $i^8$ move the gear-wheel $e^e$, held fast by the clutch $e^f$, and through the shaft $e^d$, bevel-gears, and worm feed the carriage toward the tools. When the clutch is open, the carriage can be adjusted for positioning the work by means of a handle on the squared end of the shaft $e^d$.

*The throw-off mechanism.*—In the undercut slot $e^h$ in the table $e^3$ is an adjustable stop $j$, having a zero mark or index adjustable along the scale $e'$, and is secured at the desired point to determine the limit of feed of the blank, and consequently the depth of the tooth to be cut. Passing through the carriage there is a rod $j^{11}$, controlled by a spring $j^{19}$, adapted to hit the stop $j$ during the feeding of the carriage, when said stop moves the rod against the stress of its spring. The opposite end of the rod on the other side of the carriage will be correspondingly moved and will allow a spring-held lever $j^2$ to fall through a slot $j^{13}$. Ordinarily this lever $j^2$ carries in its end a hardened-steel pin $j^4$, secured in position by a set-screw prolonged into a handle which rests on the squared end of the rod $j^{11}$; but when the slot registers with the pin $j^4$ the lever $j^2$ is pulled down through the slot by a spring $j^6$, that is hooked to a pin $j^7$ in the frame, said lever being arrested in its movement by a stop $j^3$, projecting from the carriage. This lever $j^2$ is pivoted in a bracket from the carriage at $j^x$ and has a shift-yoke $j^{12}$, that engages the clutch $e^f$, and when the rod is slid through the carriage by abutting against the stop $j$ the pin $j^4$ is pulled through the slot. The lever is pulled down by its spring against the stop $j$, which throws the yoke $j^{12}$ out and disengages the clutch, allowing the wheel $e^e$ to run idle. Under the carriage and supported by the bracket $e^{10}$ is a bearing $e^m$, through which the arcuate rod 10 passes and in which is a clamp-nut $e^{31}$ to lock them together after the work has been adjusted, thus actuating the arcuate bar and the parallel motion from the carriage, as described.

The operation is as follows: Supposing we wish to make a bevel-gear having one hundred and twenty teeth, we may divide this by a dividing-wheel $h$ having two hundred and forty teeth. This dividing-wheel $h$ is clamped on the sleeve $g^4$, and the partial disk $h^1$ is clamped by means of its set-screw in such a position that the pawl $h^9$ will ride over two teeth and part of the surface $h^1$, so that on its return or forward travel it will slide off the surface $h^1$ and move the dividing-wheel $h$ two teeth. We now select a mandrel $g^7$ to fit the boss of our wheel-blank W and screw the same home in the head-stock by means of the screw $g^8$, then place the blank on the mandrel and hold it by means of the nut and washer $g^9$ and bring the tail-stock $g^{20}$ forward, so that the projection from the end of the mandrel is journaled in it. The carriage is then moved on its bed and set on the scale in the table to the angle corresponding to the conicity of the blank. The bolts $d^8$ are loosened and the former-arms set by their scales so that the index-arms $c^5$ are set to the required angle and the bolts $d^8$ tightened. In order to aid this last adjustment, there is a spring-controlled index-finger $d^k$ held in the bracket $d^2$ to which this scale is set. Then the connecting-rod $d^a$ is set to the scale on the slotted lever $d^c$, also graduated to read angles of conicity. The former-arms are now clamped rigidly by the bolts through the frame and the wheel is roughed out, and after this the bolts are loosened and the carriage returned to its initial position and clamped to the arcuate rod 10. Power is applied to the belt-pulley, driving the pinion and spur-gear, which in turn rotates the slotted disk and therefrom reciprocates the tools, at the same time revolving the cam $f$ on the spur-wheel and rocking the lever and rock-shaft to vertically reciprocate the bobbin $f^8$, which transmits said motion to the rock-shaft $h^{10}$, which operates the connecting-rod $h^4$, to the lever $h^5$ to draw the pawl $h^9$ down, and at the same time cams out the locking-pawl $h^a$ and allows the dividing-wheel $h$, clamped to the sleeve $g^4$, to be turned the predetermined number of teeth. Every revolution of the dividing-wheel $h$, clamped and keyed to the sleeve $g^4$, will cause a reciprocation of the eccentric and rod $i^2$ to rock the shaft $i^4$ and move the pawl $i^8$, thus rotating the gears $i^5$ $e^e$ and bevel-wheels $e^c$ $e^b$ to rotate the worm-gearing with the teeth on the edge of the table to feed the carriage forward to the cutting-tools.

To produce involute teeth according to this invention, the angle of the radial arm should theoretically be seventy-five and one-half degrees to the line joining the former-arm centers, and the length of the radial arm should theoretically vary so as to be one-fourth of the pitch-line radius. To produce exact work, the distance between the radial-arm center and the former-arm pivot should be four times the length of the radial arm, or, what amounts to the same thing, the distance between the joint-line 114 and the former-arm center should be of this length.

It will be observed that in setting up the work in the machine the bevel-wheel blank, which is a frustum of a cone, will be so placed on the spindle of the carriage that the apex of the cone will be at the intersection of the line of centers of the former-arm and spindle, called for the purpose of this explanation the "common center." The carriage, and of course the blank, is moved toward the cutters, so that an imaginary cutter traveling in the line of centers—namely, a horizontal plane—would traverse an element of the cone in this horizontal plane through the axis of the blank, and no adjustment of such a cutter, were it possible to use one, would be necessary for blanks of different taper or cone-angle, for the reason that the positioning of the blank on the spindle of the carriage can always be made so that such an imaginary cutter will travel along that element of the cone lying in a horizontal plane through the axis of the cone. Such an imaginary cutter cannot be used, as I desire to have one cutter travel above and the other below this horizontal axial plane, said plane passing through the center of the tooth being cut. Now in order to cut a tooth the cutters are spread apart so that they will cut in planes above and below this horizontal axial plane, converging to the common center. The question now arises how much are the tools to be spread. Now referring to the machine, we will see that each former-arm, which has a length depending on the size of the machine and which we will call S, carries at its end an arcuate slot whose center is the common center, and each slot is provided with a graduated scale and an index-finger. These scales are graduated to read degrees, (these are degrees and measure the angle of the tooth, which depends on the number of teeth in the blank and the pitch,) and the divisions are such that when the former-arms are clamped in position to cut a definite number of teeth this number will be cut on a circle whose radius is $\frac{S}{\sqrt{2}}$, which corresponds to the base of a cone the slant height of which is S. Now this supposes the cutters to be at a distance S from the common center, and as they travel along elements of this cone from base to apex they travel along the sides of a triangle, and as all lines parallel to the base of this triangle are proportional the cutters will divide all circles of which the cone having a slant height S is a locus into the same number of parts. Thus we get a proper spread of the cutters to cut a miter-wheel tooth.

The rotation of the blank to cut successive teeth is accomplished by mechanism on the carriage already fully explained. So far the teeth cut will be perfect rectangles on their sides, with trapezoidal ends and faces—in short, they will be pyramidal.

Now we desire to cut instead of flat faces such as have a curved surface such that a section taken at right angles to the axis of the wheel will disclose an outline of a tooth drawn on the involute or odontograph system. A word about the shape. This outline of a tooth consists of two involute curves extending from the point of a tooth to the root; but odontograph teeth, however, are not true involute curves. They are approximations to this, and the practical shape is usually the arcs of circles struck with a radii of one-fourth the equivalent spur-wheel pitch-line radii, whose centers are on opposite sides of the tooth on a line making an angle of seventy-five and one-half degrees with the radius and through the pitch-point, thus producing a tooth the distance between whose faces is a quantity increasing from point to root of the tooth. Such a tooth we desire to produce, and it will be seen that in order to do this the cutters must be slightly spread after each cut, and this is done by the lever $d$, each of whose arms is of a length $\frac{S}{4}$, or $$S \times \tan. 45° \div 4.$$

It will be observed that forty-five degrees is the cone-angle of a miter-gear, being one-half of ninety degrees, the whole angle at the apex. Now for miter-gears the feed of the blank to the cutters (angular movement of the table) is equal to the angular movement of the arm $d$ toward a vertical. The upper end of the arm $d$ thus describes the arc of a circle and in doing so spreads the parallel-motion, the extent of this spread (vertical movement) being measured by the length of ordinates dropped from the arc described by the end of the lever $\frac{S}{4}$ to its chord. This lever $d$ is so linked to the carriage that when said carriage moves an angular distance measured by its chord of the arc described with a radius of S inches the lever-arm $d = \frac{S}{4}$ will describe an arc measured by a chord of equal length, and the former-arms are spread a distance measured by ordinates dropped from the latter curve to the chord. Now this vertical motion will be proportionally reproduced by the tools, and as the amount of movement of the blank toward the tool is the same as the horizontal movement of the lever $d$ (measured on the chord described by it as an abscissa) the curve cut by the tools will be a reproduction of that described by the lever $d$—that is, an arc whose radius is one-fourth the pitch-line radius. Thus far miter-gears have been taken as the type of wheel cut, but the machine is not limited to cutting these only.

As described above, the radial arm $d$ has a length of $$\tfrac{1}{4} \times S \times \text{tang. of cone-angle},$$

and if gears having a greater cone-angle than forty-five degrees are to be cut it will be noticed that in this formula the "tangent of the angle" is an increasing quantity for all wheels of cone-angle above forty-five degrees. Therefore the total product will be an increasing quantity, which means that the length of the radial arm must be increased. Now this is not practical, and in order to overcome this difficulty and still maintain the given length of the radial arm a method of adjustment had to be devised to meet the requirements, so that the curve cut by the tool would still have a radius of one-fourth the pitch-line radius of the equivalent spur-wheel. This adjustment must be such as to produce a movement of the lever-arm slower than that of the blank, for the length of this arm would be $$\tfrac{1}{4} \times S \times 2.7475$$

for a pitch cone-angle of seventy degrees. Now to produce a curve having this radius the linkage is altered to produce this effect. If L be the distance from the axis of the slotted lever to the connecting-rod therein, selected for gears of forty-five-degrees-pitch cone-angle, this length will have to be shortened to give the proper movement to the radial arm. Now the distance L is obtained as follows: Let M be the chord of an arc struck with the fixed radius $\tfrac{S}{4}$. The versed sine of this arc will be, say, H. Next find that arc that has the same versed sine H and a radius $$\frac{S \tan. 70°}{4}$$

and find the length of its chord N. The ratio of these chords multiplied by the selected distance L on the slotted lever $d^c$ will give the new length $$\frac{L \times M}{N} = L',$$

that will determine the motion of the radial arm $d$, so that the tool will cut a flatter curve than on miter-gears. The same formula applies to gears having a cone-angle less than forty-five degrees; but here the movement of the radial arm must be faster than the carriage, so as to produce a greater curvature. The new distance $L''$ will be longer than the others. Now in making this last adjustment the radial arm $d$ is thrown out of position—i. e., does not make seventy-five and one-half degrees with the horizontal, so that an adjustment for this deviation is necessary, which is made by the scale $d^7$, in which graduations measure the distance D of the end of the radial arm from a vertical and is found by the following:

$$\tfrac{S}{4} \text{ tang. of cone-angle (sine } 14\tfrac{1}{2}°): D :: \tfrac{M}{2} : \tfrac{N}{2},$$

or $$B:D::A:C.$$
$$A.D = C.B.$$
$$D = \frac{C.B}{A}.$$

Now $$A = \frac{M}{2},$$

equals one-half the chord of that arc which has a versine of H and a radius of $$\frac{S \times \tan. \text{ of cone-angle}}{4}.$$

$$C = \frac{N}{2},$$

equals one-half the chord of the arc having a versed sine of H and a radius of $\tfrac{S}{4}$, (fixed.)

$$B = \frac{S \times \tan. \text{ of the cone-angle}}{4} \times \text{sine } 14\tfrac{1}{2}°.$$

Then the formula becomes $$B:D::A:C,$$

or the corrected position of the radial arm of the machine is $$D = \frac{B \times C}{A}.$$

These last two scales read cone-angles, so that the workman will have no calculating to do, and makes adjustments to but two quantities—cone-angle and number of teeth.

In the place of the spring-point index shown for adjusting the parallel-motion I may use a beveled plate secured to the top of the upper channel $d^{20}$, which can be set to a vertical line on the face of the standard $d^2$, in which case the overhanging arm of said standard will be cut off.

The machine will cut involute teeth. The arrangement of the parallel-motion, former-arms, and radial arms with the carriage give the shape to miter and bevel wheels without the use of templets or shapers on the principle of the odontograph.

Having thus described my invention, what I claim as new therein, and desire to secure by Letters Patent, is—

1. In a gear-cutting machine, a parallel-motion, a former-arm connected to a member thereof, a tool reciprocable on the former-arm, a work-carriage organized to feed work to the tool and proportionately move the former-arm, substantially as set forth.

2. In a gear-cutting machine, the combination with a pivoted former-arm, of a tool reciprocable thereon, means for adjusting the inclination of said arm to cut gears of different conicity, a parallel-motion, a work-carriage adapted to feed the work to the tool, and mechanism connecting the work-carriage and parallel-motion, whereby the former-arm is moved to cause the tool to cut a curved tooth-face, substantially as set forth.

3. In a gear-cutting machine, the combination with a pair of former-arms hinged on a common fulcrum, reciprocating tools thereon, a centrally-pivoted radial arm each end of which is connected by intermediate devices to a former-arm adapted to change the spread of the former-arms, a work-carriage movable about a pivot and mechanism operated by the carriage to change the angularity of said radial arm, substantially as set forth.

4. In a gear-cutting machine, a parallel-motion, a pair of former-arms supported by links from the horizontal members thereof, a tool reciprocable on each former-arm, a work-carriage organized to feed the work to the tools, and mechanism operated by the work-carriage to cause a variation in the spread of the parallel-motion, and former-arms, substantially as set forth.

5. In a gear-cutting machine, a pair of lever-arms pivoted at one end, slotted free ends thereon, a parallel-motion each of the horizontal members thereof connected to one of said slotted free ends, and a lever operated from the work-carriage and operating the parallel-motion, all in the proportions set forth.

6. In a gear-cutting machine, the combination with a pair of former-arms pivoted at one end, a parallel-motion adjustably connected to their other ends, a working carriage, a rod adapted to be clamped to said carriage, said rod and an intermediate mechanism adapted to vary the spread of the parallel-motion, substantially as set forth.

7. In a gear-cutting machine, a pair of former-arms having a common fulcrum, tools reciprocating on said arms, a parallel-motion, the free ends of said lever-arms connected thereto, a work-carriage adapted to feed work to the tools, and mechanism operated by the carriage to vary the parallel-motion and thereby the spread of the lever-arms, substantially as set forth.

8. In a gear-cutting machine, a pair of former-arms having a common fulcrum at one end and enlarged slotted free ends, a parallel-motion, means for adjustably connecting the parallel-motion and free ends of the former-arms to cut wheels of different conicity, a carriage adapted to feed work to the tools, and mechanism between the carriage and parallel-motion to vary the spread of the lever-arms, substantially as described.

9. In a gear-cutting machine, mechanism for varying the spread of the tools comprising a pair of parallel channels connected by links of equal length and inclination, a rod connecting one of said links with a slotted lever, in combination with a work-carriage and mechanism connected thereto to operate the said slotted lever, substantially as set forth.

10. In a gear-cutting machine, a pair of lever-arms having a common fulcrum at one end, in combination with a parallel-motion comprising two parallel channels, sliding blocks in each channel, the free ends of said lever-arms connected to said blocks, a work-carriage, and means connected to the work-carriage to vary the spread of the lever-arms, substantially as described.

11. In a gear-cutting machine, a parallel-motion, a pair of former-arms link-supported from the horizontal members thereof, means for adjusting the spread of the former-arms, a tool reciprocable on each arm, a carriage arranged to feed work to the tools and mechanism operated by the carriage to vary the spread of the parallel-motion and former-arms, substantially as set forth.

12. In a gear-cutting machine, a throw-off mechanism on the carriage, comprising a pusher-bar, a slot in one end thereof, a spring-held lever resting on said bar and adapted to pass through the slot in the bar, feed-gear and a clutch operated by the spring-held lever to disengage the gear from its shaft, substantially as set forth.

13. In a gear-cutting machine, a tool-holder comprising a base, a tool-carrier hinged thereto, a spring adapted to hold the same in normal position, means for universally adjusting the tool, and a cam adapted to cam the tool-carrier and tool away from the face of the work, substantially as described.

14. In a gear-cutting machine, a parallel-motion, a pair of former-arms connected to the horizontal members thereof, means for adjusting the spread of the former-arms, independent means for adjusting the spread of the horizontal members of the parallel-motion, a work-carriage, an arcuate rod adjustably connected thereto, and mechanism operated by said rod and organized to vary the spread of the parallel-motion and former-arms, substantially as set forth.

15. In a gear-cutting machine, the combination with a carriage feeding work to the tools; of mechanism for varying the spread of the tools, comprising a parallel-motion, means for adjusting the inclination of the links of said parallel-motion, a lever, an arcuate rod adjustably connected to said carriage and arranged to impart motion to said lever, and a rod between said lever and parallel-motion and adjustable in the former, substantially as set forth.

16. In a gear-cutting machine, former-arms having motion around a pivot, tool-holders thereon and mechanism for reciprocating said tool-holders, in combination with a parallel-motion for varying the spread of said former-arms, and devices for moving the tools from the face of the work during their return travel, substantially as set forth.

17. In a gear-cutting machine, the combination with a pair of pivoted former-arms and enlarged slotted ends on said arms, of a parallel-motion comprising parallel channel-shaped members and links organized to simultaneously move said members parallel to each other, blocks slidable in said channels, parts pivoted in said blocks and adjustably secured to the slotted ends of said former-arms, substantially as set forth.

18. In a gear-cutting machine, the combination with a pair of pivoted former-arms and enlarged slotted ends on said arms, of a parallel-motion comprising parallel members and links organized to simultaneously move said members, blocks slidable in relation to said parallel members and connected to said former-arms, and mechanism organized to vary the spread of said parallel-motion, substantially as set forth.

19. In a gear-cutting machine, the combination with a pair of pivoted former-arms, and a parallel-motion connected to the former-arms, of a work-carriage revoluble on a pivot, a rod adjustably secured to said carriage, a swinging lever operated by said rod, and a link connecting the parallel-motion to said lever and adjustable therein, substantially as set forth.

20. In a gear-cutting machine, the combination with former-arms having a common pivot, tools reciprocable on each, of a parallel-motion, means for setting the spread of the former-arms to cut different gears, means for adjusting on the parallel-motion the spread of the former-arms, and independent means for regulating the movement of the parallel-motion, substantially as set forth.

21. In a gear-cutting machine, a throw-off mechanism on the carriage comprising coöperating gear-wheels organized to move said carriage, a spring-held pusher-bar, a spring-held bell-crank lever organized to move one of the gear-wheels into and out of operative relation with its coöperating wheel, said lever arranged to be released by said pusher-bar at the end of the travel of said carriage to cause a gear to run idle, substantially as set forth.

In testimony that I claim the foregoing as my invention I have signed my name in presence of two subscribing witnesses.

THEODORE COVENTRY.

Witnesses:
PETER J. LIVSEY,
WILLIAM FAULKNER.